Patented Nov. 15, 1927.

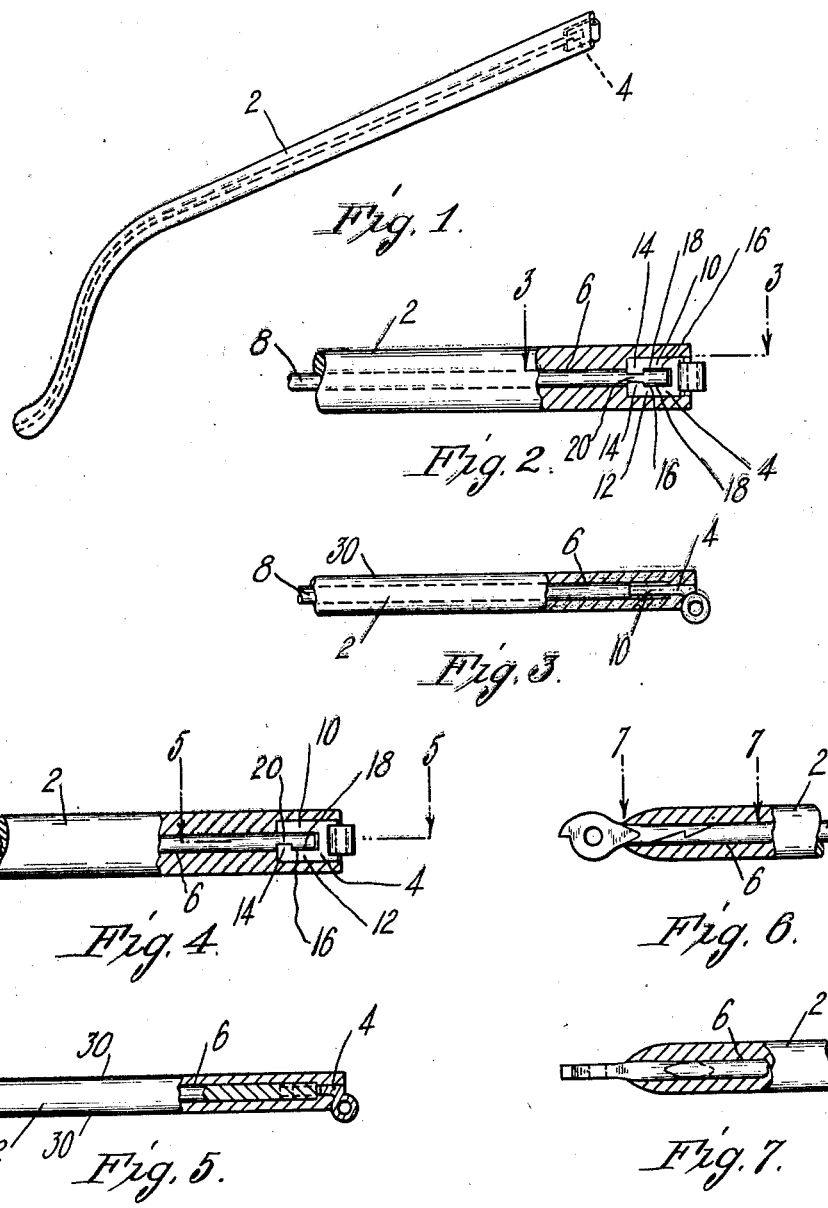

1,649,791

UNITED STATES PATENT OFFICE.

JAMES W. WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

SPECTACLE TEMPLE AND METHOD OF MAKING THE SAME.

Application filed January 15, 1923. Serial No. 612,662.

The present invention relates to ophthalmic mountings and methods of making the same, and though certain features thereof are applicable to other mountings, the invention relates more particularly to metal-reinforced, non-metallic spectacle temples.

In some types of spectacle temples of the above-described character, a metal reinforcing rod, that is enclosed within a non-metallic tube, is supplemented by a separate metal hinge plate that is provided at the forward end of the temple. The hinge plate may be secured to both the reinforcing rod and the non-metallic tube, or to the non-metallic tube alone, by screws or rivets. The screws or rivets weaken the temple and, furthermore, detract from its appearance. Where the screw or rivet extends through the hinge plate and the tube alone, there is a tendency for the non-metallic tube to break into two parts, one containing the reinforcing rod and the other the hinge plate. It has therefore been proposed to form the reinforcing rod and the hinge plate in one piece; but this proposal may be too costly, because requiring that the hidden reinforcing rod, which could otherwise be constituted of base metal, must be of the same more valuable metal as the more conspicuous hinge plate. In the more usual case, it is desired to have the reinforcing rod of a light-weight metal, like aluminum, and this metal would not have the strength required of a hinge plate.

It is accordingly an object of the present invention to provide a spectacle temple having a reinforcing rod and a hinge element constituted of different metals and that shall be joined together by means wholly enclosed within the tube, and without the aid of projecting screws, rivets, and the like.

Other objects of the invention will be made clear by the following description, taken in connection with the accompanying drawings, in which Fig. 1 is a perspective view of a spectacle temple constructed according to a preferred embodiment of the present invention; Fig. 2 is a fragmentary elevation, partly in section, of a modification; Fig. 3 is a view similar to Fig. 2, the section being taken upon the line 3—3 of Fig. 2, looking in the direction of the arrows; Fig. 4 is a view similar to Fig. 2 of the preferred embodiment shown in Fig. 1; Fig. 5 is a section similar to Fig. 3, taken upon the line 5—5 of Fig. 4, looking in the direction of the arrows; Fig. 6 is a section similar to Figs. 3 and 5 of another modification; and Fig. 7 is a section similar to Figs. 2 and 4, taken upon the line 7—7 of Fig. 6, looking in the direction of the arrows.

The invention is illustrated as applied to a spectacle temple of the combined-metal-and-non-metallic type, which is chosen to typify any ophthalmic mounting. The temple comprises a non-metallic member, shown as a seamless tube 2, provided at its forward end with a hinge plate 4, whereby it may be hinged to a spectacle-lens frame. The tube 2 tapers on its outer surface from the forward end towards the rear end, as shown in Fig. 1, and it is further shown taperingly flattened at the sides 30. Within the bore 6 of the tube is completely enclosed a reinforcing member, shown as a metal rod 8. The hinge plate 4 may be of nickel. The reinforcing rod may be of aluminum. The chief object of the present invention is to provide an inconspicuous and efficient joint for the reinforcing rod 8 and the hinge plate 4. It is not possible to solder these metals together, though it is considered that a soldered joint would be within the scope of this invention. In the specific embodiments of the invention that are herein illustrated and described, the joint is obtained by interlocking the rod 8 and the hinge plate 4 together within the tube covering, but it will be understood that the invention is not restricted to the illustrated or described embodiments.

In the preferred embodiment that is illustrated in Figs. 1, 4 and 5, the hinge plate is provided with two arms 10 and 12, one of which is provided with a hook 14 and a recess 16. The rod 8 is similarly provided with a hook 18 and a recess 20. The hook 14 of the hinge arm 12 locks into the recess 20 of the rod 8, and the hook 18 of the rod 8 locks into the recess 16 of the hinge plate 4.

In the modification shown in Figs. 2 and 3, each arm 10 and 12 is provided with a hook 14 and a recess 16, and the rod 8 is provided with two oppositely disposed hooks 18 and recesses 20. A more uniform interlocking effect is thus obtained, but at the expense of greater complications in structure.

The hooks 14 and 18, and the recesses 16 and 20 are shown blunt in Figs. 1 to 5. They may obviously be sharp cornered, as shown in Figs. 6 and 7.

In none of the illustrated constructions is there any tendency for the non-metallic tube to break near the point of junction of the reinforcing rod to the hinge plate, the spliced joint between them being substantially as strong as though they were formed in one piece.

Other modifications also will suggest themselves to persons skilled in the art, and are considered to fall within the spirit and scope of the present invention. The invention is of a broad nature, and it is therefore desired that the appended claims be broadly construed, unlimited except in so far as limitations may necessarily be imposed by the state of the prior art.

The method of manufacture of the improved temple of the present invention may naturally vary, depending upon the nature of the modification that may be adopted by persons skilled in the art. The illustrated modifications may conveniently be made by first interloocking the rod 8 and the hinge plate 4, and then forcing the interlocked rod and hinge plate into the non-metallic tube, after which the tube, with the reinforcing rod enclosed therein, may be bent into the shape of a temple. If the non-metallic material of the tube is zylonite or a similar compound, the bore 6 of the tube may previously be lined with a solvent to soften its walls and thus facilitate the introduction of the rod into the tube. The reinforcing rod and the hinge plate will thereby become cemented in position within the bore 6 of the tube, which will eliminate any tendency for the parts to become loosened.

What is claimed is:

1. An ophthalmic mounting having, in combination, a non-metallic tube, and two interlocking metal elements in the non-metallic tube and permanently locked rigidly together.

2. A spectacle temple having, in combination, a non-metallic element, a reinforcing metal element within the non-metallic element, and a hinge element in the non-metallic element interlocked with the reinforcing element.

3. A spectacle temple having, in combination, a non-metallic tube, a reinforcing rod within the tube, and a hinge element in the tube interlocked with the reinforcing rod, the reinforcing rod and the hinge being constituted of different metals.

4. The method of making a spectacle temple that comprises interlocking a reinforcing rod and a hinge element, forcing the interlocked rod and hinge element into a non-metallic tube, and bending the tube to the shape of a temple.

5. A spectacle temple having, in combination, a non-metallic tube, and a reinforcing rod and a hinge element in the tube, the reinforcing rod and the hinge element being constituted of different metals and having means wholly enclosed within the tube for joining them together.

6. A spectacle temple having, in combination, a temple element, a reinforcing metal element for the temple element, and a hinge element of different metal interlocked with the reinforcing element.

7. An ophthalmic mounting having, in combination, a metal hinge element, a metal element interlocked with the hinge element, and a non-metallic covering for the interlocked elements.

In testimony thereof, I have hereunto subscribed my name this 12th day of January, 1923.

JAMES W. WELSH.